(12) United States Patent
Berg

(10) Patent No.: US 10,753,390 B2
(45) Date of Patent: Aug. 25, 2020

(54) SELF-ALIGNING ROLLER BEARING

(71) Applicant: Aktiebolaget SKF, Gothenburg (SE)

(72) Inventor: Roger Gustav Petter Berg, Gothenburg (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/550,456

(22) Filed: Aug. 26, 2019

(65) Prior Publication Data

US 2020/0088235 A1    Mar. 19, 2020

(30) Foreign Application Priority Data

Sep. 18, 2018   (DE) .......................... 10 2018 215 843

(51) Int. Cl.
*F16C 23/08*  (2006.01)
*F16C 33/78*  (2006.01)
*F16C 33/46*  (2006.01)

(52) U.S. Cl.
CPC ............ *F16C 23/08* (2013.01); *F16C 33/467* (2013.01)

(58) Field of Classification Search
CPC ...... F16C 19/28; F16C 23/082; F16C 23/086; F16C 23/088; F16C 33/36; F16C 33/7806; F16C 33/7836; F16C 33/7893
See application file for complete search history.

(56) References Cited

U.S. PATENT DOCUMENTS 9,739,313 B2     8/2017  Back
2015/0176654 A1*  6/2015  Back ..................... F16C 33/805
                                                 384/480

FOREIGN PATENT DOCUMENTS

| EP | 2808570 A1 | * | 12/2014 | .......... F16C 33/7893 |
| FR | 3029245 A1 | * | 6/2016 | .......... F16C 33/7893 |
| FR | 3052831 A1 | * | 12/2017 | .......... F16C 33/7893 |
| JP | 2007198540 A | * | 8/2007 | .......... F16C 33/7893 |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A self-aligning roller bearing having an inner and an outer bearing ring, at least one row of roller elements disposed between the inner and outer bearing ring, a cage for guiding the roller elements, a shield element comprising a ring-formed shield provided at a first axial side of the self-aligning roller bearing, the ring-formed shield being configured for preventing foreign matter from entering an interior space between the inner ring and the outer ring, the shield element further comprising a plurality of male connection elements protruding out from the ring-formed shield. The cage having a cage side portion provided at the first axial side. The cage side portion includes a plurality of female connection elements. Each male connection element is inserted into a respective female connection element of the plurality of female connection elements forming mating pairs of connection elements hereby connecting the shield element to the cage side portion.

20 Claims, 4 Drawing Sheets

SELF-ALIGNING ROLLER BEARING

CROSS-REFERENCE TO RELATED APPLICATIONS

This application claims priority to German patent application no. 102018215843.6 filed on Sep. 18, 2018, the contents of which are fully incorporated herein by reference.

FIELD OF THE INVENTION

The present disclosure relates to a self-aligning roller bearing which comprises at least one shield element which is configured for preventing foreign matter from entering an interior space between an inner ring and an outer ring of the bearing.

BACKGROUND OF THE INVENTION

Self-aligning roller bearings are known for its ability to handle demanding applications where the loads are high and where shaft deflections also can be expected. In fact, by using rollers instead of balls, larger loads can be accommodated. Moreover, the self-aligning capability, i.e. the capability of the bearing's inner and outer rings to be relatively misaligned, protects the bearing from internal stresses caused by shaft deflections, and therefore the bearing's service life may not be negatively affected by such deflections.

There are different types of self-aligning roller bearings, where one of the most common types may be the spherical roller bearing which comprises two rows of symmetrical rollers, a common sphered outer ring raceway and two inner ring raceways inclined at an angle to the bearing axis. The center point of the sphere in the outer ring raceway is at the bearing axis. There are also other types of self-aligning roller bearings. Such other examples may be 1) the spherical roller bearing which has two rows of asymmetrical rollers and 2) the toroidal roller bearing which comprises one row of rollers and where the bearing can accommodate both shaft deflections and axial shaft displacements.

It is also known to provide self-aligning roller bearings with seals for sealing off the openings between the inner and the outer ring. Such seals may be provided on the outside of the axial side face of the bearing or they may be integrated such that the seal is located in-between the bearing's rings without extending axially outside the bearing's perimeter. An advantage with sealed bearings is that it prevents foreign matter from entering the bearing's inside, and also it may be used for accommodating lubricant, such as grease. The sealing function is generally provided by the use of a circumferentially extending sealing lip made of rubber, which is in contact with either the inner or the outer ring.

One example of a sealed self-aligning roller bearing can be found in U.S. Pat. No. 9,739,313 B2, which discloses a seal unit formed in a multiple piece manner, the seal unit including an at least part-ring shaped main element which is freely rotatable with respect to the bearing's inner and outer ring and at least one seal lip. The seal lip provides a sealing between any one of the bearing's rings and the main element. Hence, there will not be a friction-free rotation between the seal unit and the bearing's rings.

Even though the above example may provide an improved bearing comprising an integrated sealing, there is however still a strive in further developing self-aligning roller bearings for more demanding applications.

BRIEF SUMMARY OF THE INVENTION

In view of the above, an object of the present invention is to provide an improved self-aligning roller bearing, or at least to provide a good alternative. More particularly, an object of the present invention is to provide a compact self-aligning roller bearing having improved performance and which is especially suitable for more demanding applications. Still further, an object of the present invention is to provide an improved self-aligning roller bearing which can easily replace an open standard dimension bearing.

The objects are achieved by the subject matter as specified in claim 1. Preferred embodiments of the invention can be found in the dependent claims and in the accompanying description and drawings.

According to the invention, the object is achieved by a self-aligning roller bearing, comprising an inner bearing ring, an outer bearing ring and at least one row of roller elements interposed in-between the inner and outer bearing ring. Furthermore, the self-aligning roller bearing comprises a cage for retaining and/or guiding the roller elements and a shield element comprising a ring-formed shield provided at a first axial side of the self-aligning roller bearing. The ring-formed shield is configured for preventing foreign matter from entering an interior space between the inner ring and the outer ring. The shield element further comprises a plurality of male connection elements protruding out from the ring-formed shield and the cage comprises a cage side portion provided at the first axial side, wherein the cage side portion comprises a plurality of female connection elements. Each male connection element is inserted into a respective female connection element of the plurality of female connection elements and form mating pairs of connection elements, thereby connecting the shield element to the cage side portion.

By the provision of the present invention, an improved self-aligning roller bearing is provided which has a high sealing performance, provides low-friction rotation and also provides a compact and robust configuration without extending the perimeter of the bearing. By providing the connection of the shield element to the cage side portion of the cage as defined herein, a robust and rigid connection will be realized, whereby the shield element will be prevented from releasing from the bearing. In addition, providing the connection on the cage side portion will also lead to that the shield element can be closely fitted to the bearing and the cage, and thereby the bearing's perimeter may not be extended. Therefore, a self-aligning roller bearing as disclosed herein could easily replace a standard bearing with similar bearing ring dimensions. Hence, an application which has been designed with an open standard bearing, i.e. a standard bearing without a shield element or a seal, could instead make use of the self-aligning roller bearing according to the present invention, without a need to re-design the application.

It shall be noted that the shield element of the present invention is a separate element with respect to the cage.

The terms axial, radial and circumferential as used herein relates to directions of the bearing in its axial, radial and circumferential directions. The axial direction corresponds to the direction following the bearing's rotation axle. The radial direction is the bearing's radial direction which is perpendicular to the axial direction, and the circumferential direction corresponds to the direction following the pathway of the bearing's roller elements.

Optionally, each mating pair of connection elements may be provided circumferentially in-between a respective pair of adjacent roller elements of the at least one row of roller elements. It has namely been found that by providing each mating pair of connection elements like this, there may be more available space for the connection elements of the shield element and the cage side portion. This in turn may allow the connection to be more robust. Still further, each mating pair of connection elements may be provided radially above and/or below the bearing pitch circle of the self-aligning roller bearing. The bearing pitch circle is well-known for the skilled person and may be defined as the circle which intersects center points of the bearing's roller elements. By providing the connection elements above and/or below the bearing's pitch circle, more space may be available for the connection elements in-between its respective pair of adjacent roller elements. Hence, the increased available space may allow the connection elements to be configured with a specific size/shape such that they become more robust.

Optionally, each male connection element may extend axially in-between a pair of adjacent roller elements of the at least one row of rollers. Thereby, an axially longer male connection may be provided, which in turn may result in a more robust connection.

Optionally, each male connection element may be press-fitted into a respective female connection element and form a mating pair of connection elements. A press-fit connection has been found to provide a robust connection which also may facilitate the mounting procedure of the shield element. The press-fit configuration may lead to that the shield element can be mounted to the bearing by pressing the shield element onto the side of the bearing, and/or by punching on the shield element.

Optionally, the self-aligning roller bearing may be provided with an outer radial gap between a radially outer surface of the ring-formed shield and the outer ring such that a friction-free rotation is provided at the outer radial gap between the ring-formed shield and the outer ring during use of the self-aligning roller bearing. It has been found that improved sealing function may be provided without increasing the friction during rotation of the bearing, such as would be the case if a sealing lip was used. Hence, a low-friction rotation may be provided in combination with a high sealing performance. Purely by way of example, the outer radial gap may be in the range of 0.5-5 millimeters (mm), such as 1-4, 1-3 or 1-2 mm. The outer radial gap is thus having a certain radial extension and further extends in the circumference of the bearing. The radial extension of the outer radial gap is preferably substantially the same around the circumference of the bearing. Still optionally, the self-aligning roller bearing may be provided with an inner radial gap between a radially inner surface of the ring-formed shield and the inner ring such that a friction-free rotation is provided at the inner radial gap between the ring-formed shield and the inner ring during use of the self-aligning roller bearing. Purely by way of example, the inner radial gap may be in the range of 0.5-5 mm, such as 1-4, 1-3 or 1-2 mm. The inner radial gap is thus having a certain radial width and further extends in the circumference of the bearing. The radial width of the inner radial gap is preferably substantially the same around the circumference of the bearing.

Optionally, the ring-formed shield may be provided axially outside the cage side portion.

Optionally, the ring-formed shield may be completely provided axially within the inner ring and the outer ring.

Optionally, the cage side portion may be ring-formed and extend radially such that it contacts the inner ring or the outer ring. Thereby, an inner ring or outer ring guided cage may be provided, also increasing the sealing function of the bearing. Such configuration may also provide an improved location for the female connection element, i.e. it may thereby be provided above and/or below the bearing's pitch circle.

Optionally, the cage may be inner ring guided, outer ring guided, or guided by the roller elements. Still further, the double-row self-aligning roller bearing may further comprise a guide ring in-between the row of roller elements.

Optionally, the bearing may be a double row self-aligning roller bearing with two rows of roller elements, such as a spherical double-row roller bearing. Alternatively, the self-aligning roller bearing may also be a toroidal roller bearing.

Optionally, the shield element may be made of any one of a polymer and a zinc-alloy.

Optionally, the self-aligning roller bearing may also comprise two shield elements, whereby one is provided on the first axial side and the other one on the opposite axial side of the bearing, and wherein the second shield element may be configured as the first shield element.

Optionally, each male connection element may be resiliently bendable and/or resiliently compressible in the circumferential direction and/or in the radial direction.

The plurality of mating pair of connection elements as described herein may be two or more pairs of connection elements, such as 3, 4, 5, 6, 7, 8, 9, 10 or more pairs of connection elements. Optionally, the pairs of connection elements may be provided equiangularly around the circumference of the shield element. Still optionally, there may also be other connection elements except for the plurality of connection elements, even though it may be preferable to provide the shield element with only one type of connection elements, e.g. for manufacturing and assembling purposes.

BRIEF DESCRIPTION OF THE SEVERAL VIEWS OF THE DRAWING

Exemplifying and preferred embodiments of the present invention will now be described more in detail, with reference to the accompanying drawings, wherein.

Figure 1:
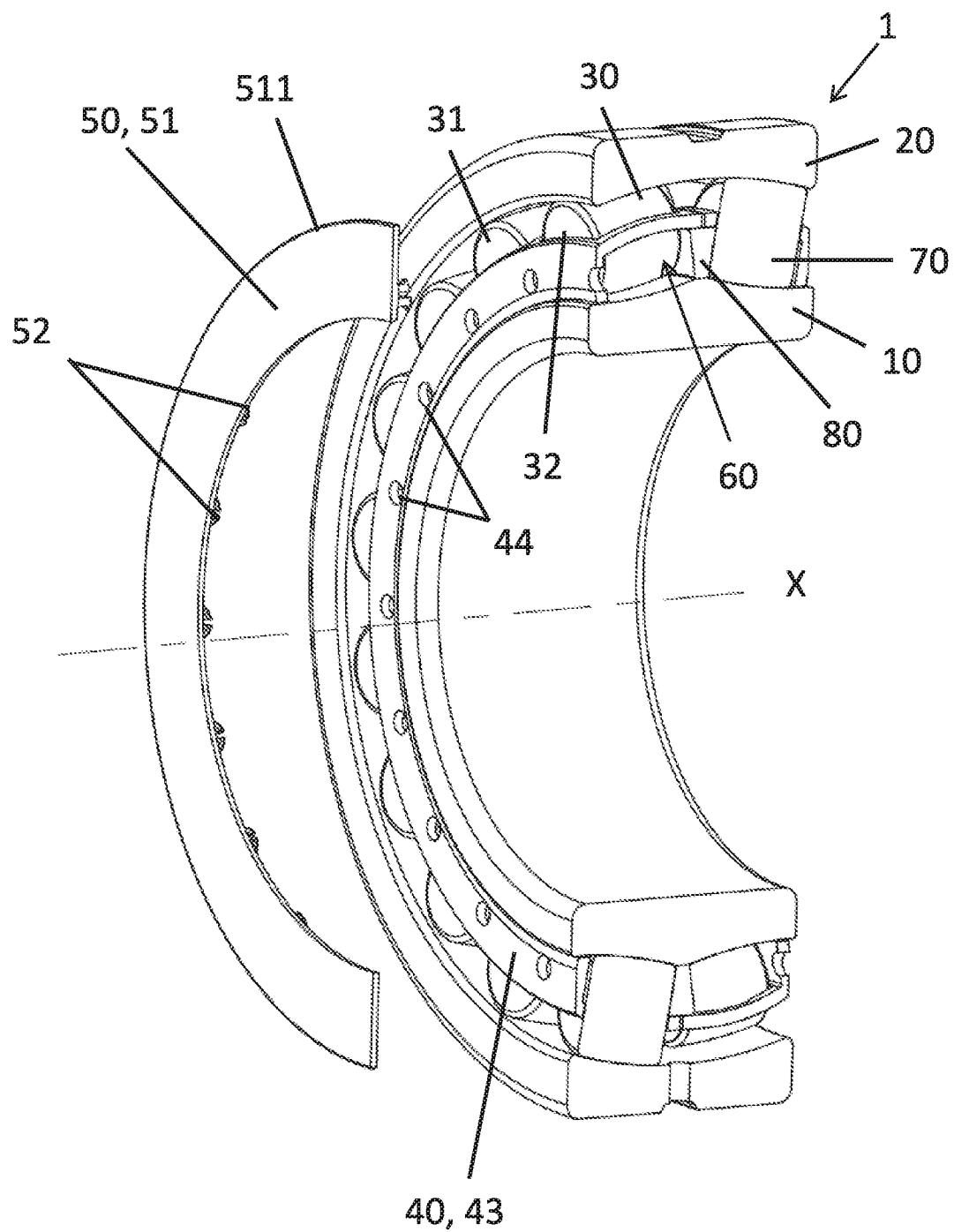
FIG. 1 depicts a three-dimensional view of a self-aligning roller bearing according to an example embodiment of the present invention.
Figure 2:
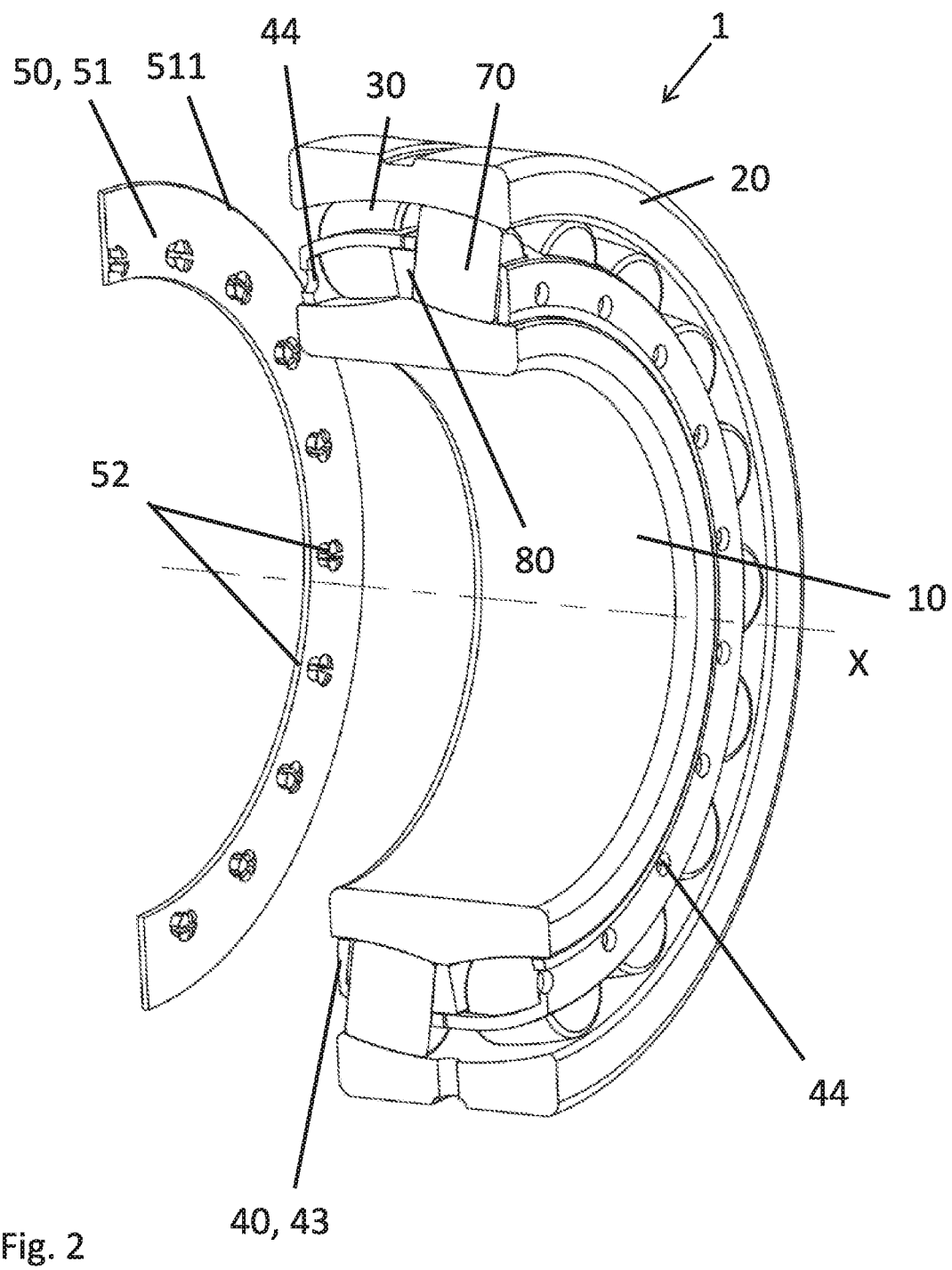
FIG. 2 depicts another three-dimensional view of the example embodiment as depicted in FIG. 1.
Figure 3:
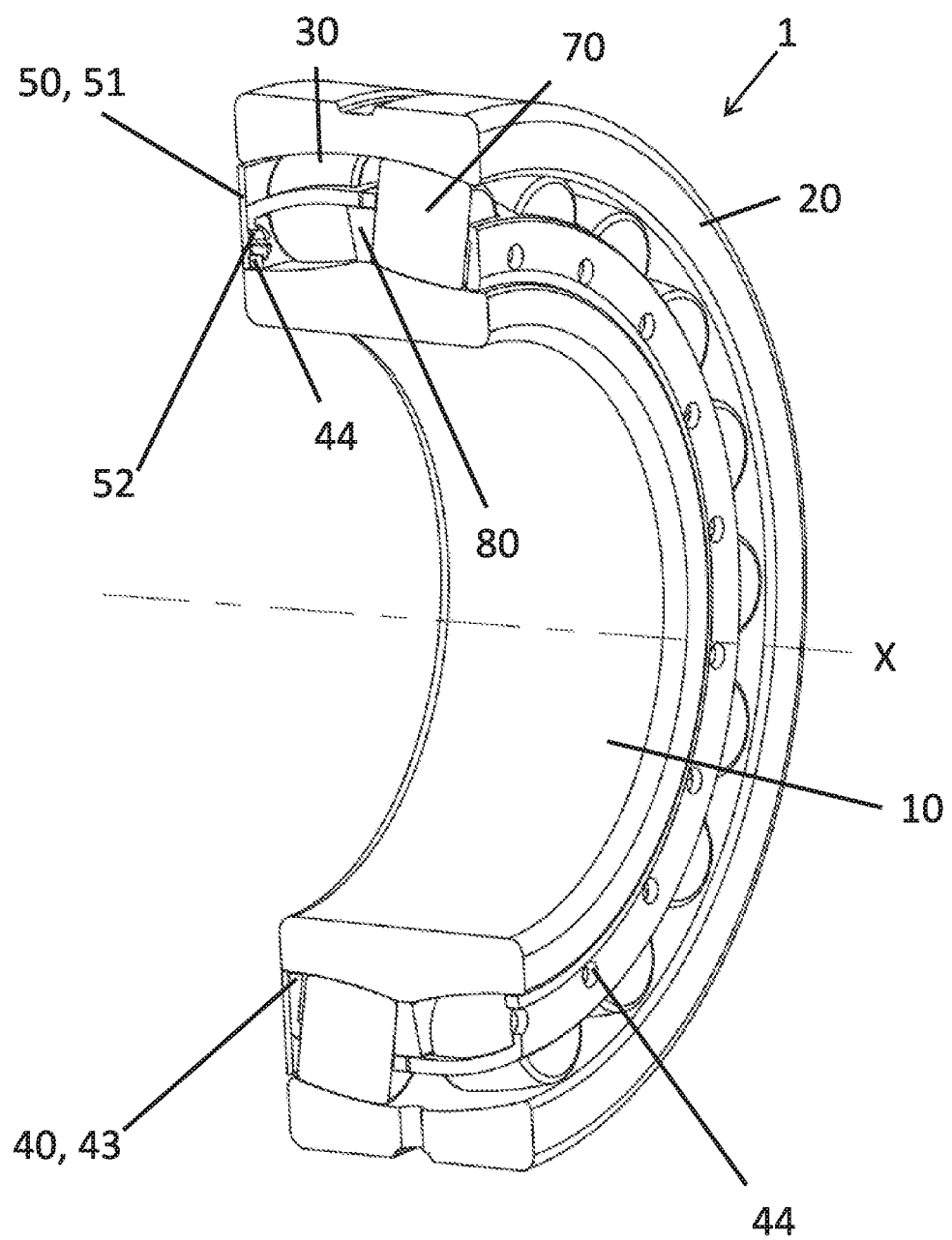
FIG. 3 depicts a three-dimensional view of a self-aligning roller bearing when the shield element is mounted onto the bearing according to an example embodiment of the present invention.
Figure 4:
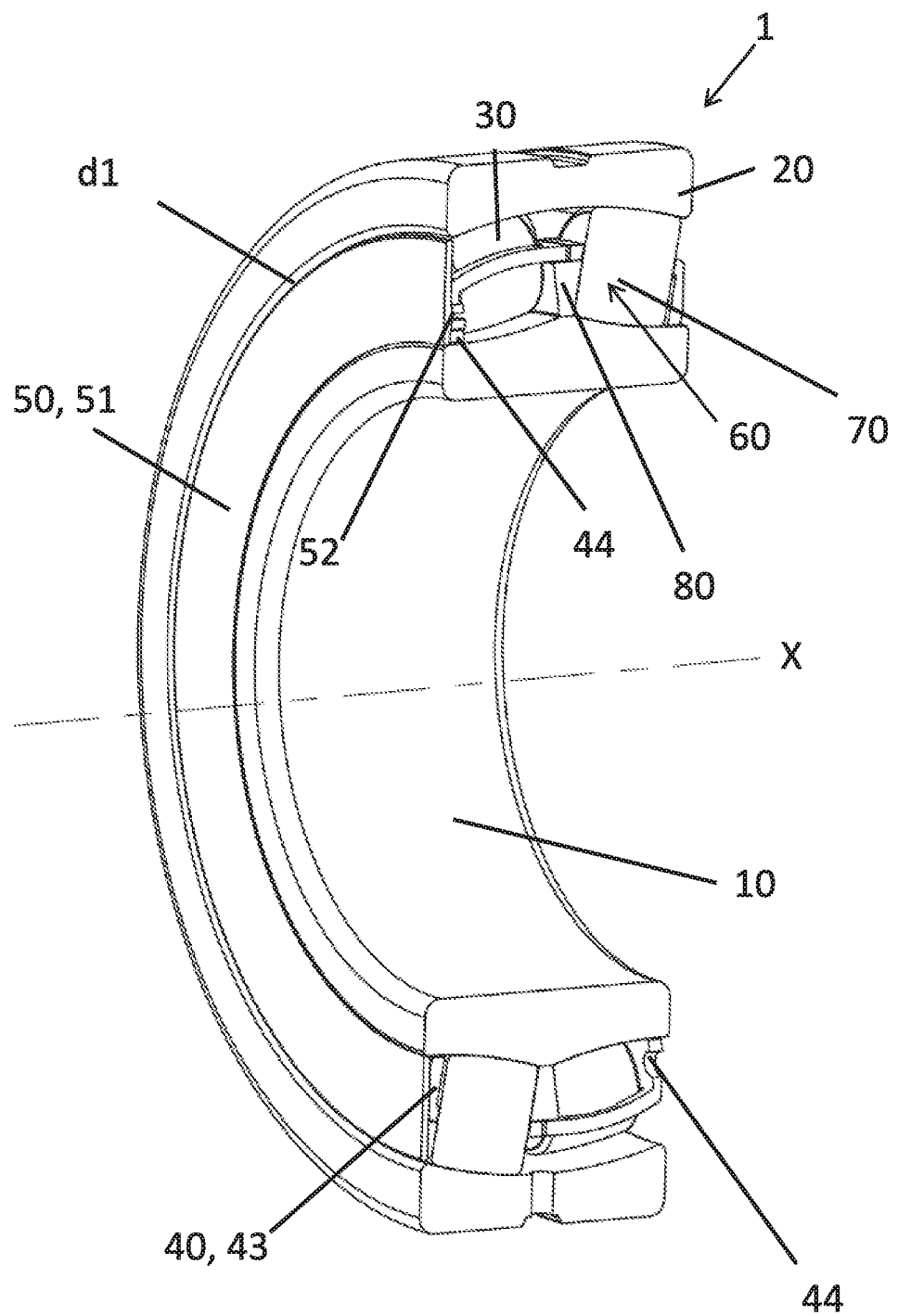
FIG. 4 depicts another three-dimensional view of the self-aligning roller bearing as shown in FIG. 3.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Throughout the detailed description, like reference numerals refer to like elements, unless explicitly expressed otherwise.

DETAILED DESCRIPTION OF THE INVENTION

With reference to FIGS. 1-4, three-dimensional and cross-sectional views of a self-aligning roller bearing 1 according to an example embodiment of the present invention is shown. The bearing 1 is in this embodiment configured as a double-row spherical roller bearing, comprising a first row 30 and a second row 70 of roller elements. The bearing 1 further comprises an inner bearing ring 10 and an outer bearing ring 20 where the two rows of roller elements, 30 and 70, are interposed in-between the inner and the outer bearing rings, 10 and 20 respectively. The rings 10 and 20 are configured to relatively rotate with respect to the bearing's rotation axis X. Furthermore, the self-aligning roller bearing 1 comprises a cage 40 for retaining and/or guiding the roller elements and a shield element 50 comprising a ring-formed shield 51 provided at a first axial side of the self-aligning roller bearing 1. Moreover, the bearing 1 is provided with a guide ring 80 for guiding the roller elements between the first and second roller rows, 30 and 70.

As can be seen in FIG. 1, the shield element 50 is here shown when it is not yet connected to the bearing 1. The ring-formed shield 51 is configured as a barrier for preventing foreign matter from entering an interior space 60 between the inner ring 10 and the outer ring 20. The shield element 50 further comprises a plurality of male connection elements 52 protruding out from the ring-formed shield 51 and the cage 40 comprises a cage side portion 43 provided at the first axial side, wherein the cage side portion 43 comprises a plurality of female connection elements 44. Each male connection element 52 is inserted into a respective female connection element 44 of the plurality of female connection elements and form mating pairs of connection elements, thereby connecting the shield element 50 to the cage side portion 43. In this particular embodiment, each mating pair of connection elements, 52 and 44, are provided circumferentially in-between a respective pair of adjacent roller elements, 31 and 32, of the first row of roller elements 30. This will provide more available space for the connection elements 52 of the shield element 50. Still further, each mating pair of connection elements, 52 and 44, are provided radially below the bearing pitch circle of the self-aligning roller bearing 1, or alternatively at least the center axis of the female connection element 44 is provided radially below the bearing pitch circle. By providing the connection elements below the bearing's pitch circle, even more space will be available for the connection elements, 52 and 44, in-between its respective pair of adjacent roller elements 31 and 32. Still further, and as seen in e.g. FIG. 3, each male connection element 52 extends axially in-between the pair of adjacent roller elements 31 and 32 of the first row of rollers 30. Thereby, an axially longer male connection element 52 can be provided. The male connection elements 52 are press-fitted into its respective female connection element 44. The press-fit is here configured by providing an outer bulging portion on the connection element 52, which outer perimeter can be compressed when pressing the bulging portion through the female connection element 44, which in this embodiment is in the form of a bore. When the outer bulging portion has been pressed through the bore 44, it will regain its original shape and size, and thereby firmly connect the shield element 50 to the cage 40. Thus, the male connection elements 52 are resiliently compressible in the bearing's circumferential and radial directions. The skilled person will realize that the male connection elements 52 may be configured differently and still provide the same function as described hereinabove.

The self-aligning roller bearing 1 is also provided with an outer radial gap dl between a radially outer surface of the ring-formed shield 511 and the outer ring 20 such that a friction-free rotation is provided at the outer radial gap dl between the ring-formed shield 51 and the outer ring 20 during use of the self-aligning roller bearing 1. Moreover, and as especially illustrated in FIG. 4, the shield element 50 is provided within the axial extensions of the inner and the outer rings, 10 and 20, thereby providing a compact bearing design.

It is to be understood that the present invention is not limited to the embodiments described above and illustrated in the drawings; rather, the skilled person will recognize that many changes and modifications may be made within the scope of the appended claims.

What is claimed is:

1. A self-aligning roller bearing, comprising,
   an inner bearing ring,
   an outer bearing ring,
   at least one row of roller elements interposed in-between the inner and outer bearing ring,
   a cage for retaining and/or guiding the roller elements,
   a shield element comprising a ring-formed shield provided at a first axial side of the self-aligning roller bearing, the ring-formed shield being configured for preventing foreign matter from entering an interior space between the inner ring and the outer ring,
   the shield element further comprising a plurality of male connection elements protruding out from the ring-formed shield,
   the cage comprising a cage side portion provided at the first axial side, wherein the cage side portion comprises a plurality of female connection elements,
   wherein each male connection element is inserted into a respective female connection element of the plurality of female connection elements forming mating pairs of connection elements, thereby connecting the shield element to the cage side portion,
   wherein the self-aligning roller bearing is provided with an outer radial gap between a radially outer surface of the ring-formed shield and the outer ring such that the radially outer surface of the ring-formed shield does not contact any other bearing component and such that a friction-free rotation is provided at the outer radial gap between the ring-formed shield and the outer ring during use of the self-aligning roller bearing.

2. The self-aligning roller bearing according to claim 1, wherein each mating pair of connection elements is disposed circumferentially between a respective pair of adjacent roller elements of the at least one row of roller elements.

3. The self-aligning roller bearing according to claim 1, wherein each mating pair of connection elements is radially positioned above and/or below the bearing pitch circle of the self-aligning roller bearing.

4. The self-aligning roller bearing according to claim 1, wherein each male connection element extends axially between a pair of adjacent roller elements of the at least one row of rollers.

5. The self-aligning roller bearing according to claim 1, wherein each male connection element is press-fitted into a respective female connection element forming a mating pair of connection elements.

6. The self-aligning roller bearing according to claim 1, wherein the outer radial gap is between zero point five millimeters (0.5 mm) and five point zero millimeters (5.0 mm).

7. The self-aligning roller bearing according to claim 1, wherein the self-aligning roller bearing is provided with an inner radial gap between a radially inner surface of the ring-formed shield and the inner ring such that a friction-free rotation is provided at the inner radial gap between the ring-formed shield and the inner ring during use of the self-aligning roller bearing.

8. The self-aligning roller bearing according to claim 1, wherein the ring-formed shield is provided axially outside the cage side portion.

9. The self-aligning roller bearing according to claim 1, wherein the ring-formed shield is completely provided axially within the inner ring and the outer ring.

10. The self-aligning roller bearing according to claim 1, wherein the cage side portion is ring-formed and extends radially such that it contacts the inner ring or the outer ring.

11. A self-aligning roller bearing, comprising,
an inner bearing ring,
an outer bearing ring,
at least one row of roller elements interposed in-between the inner and outer bearing ring,
a cage for retaining and/or guiding the roller elements,
a shield element comprising a ring-formed shield provided at a first axial side of the self-aligning roller bearing, the ring-formed shield being configured for preventing foreign matter from entering an interior space between the inner ring and the outer ring,
the shield element further comprising a plurality of male connection elements protruding out from the ring-formed shield,
the cage comprising a cage side portion provided at the first axial side, wherein the cage side portion comprises a plurality of female connection elements,
wherein each male connection element is inserted into a respective female connection element of the plurality of female connection elements forming mating pairs of connection elements, thereby connecting the shield element to the cage side portion,
wherein the self-aligning roller bearing is provided with an outer radial gap between a radially outer surface of the ring-formed shield and the outer ring such that a friction-free rotation is provided at the outer radial gap between the ring-formed shield and the outer ring during use of the self-aligning roller bearing, and
wherein the radially outer surface of the ring-formed shield is axially aligned with a first axial end of the outer ring and a first axial end of the inner ring.

12. The self-aligning roller bearing according to claim 11, wherein each mating pair of connection elements is disposed circumferentially between a respective pair of adjacent roller elements of the at least one row of roller elements.

13. The self-aligning roller bearing according to claim 11, wherein each mating pair of connection elements is radially positioned above and/or below the bearing pitch circle of the self-aligning roller bearing.

14. The self-aligning roller bearing according to claim 11, wherein each male connection element extends axially between a pair of adjacent roller elements of the at least one row of rollers.

15. The self-aligning roller bearing according to claim 11, wherein each male connection element is press-fitted into a respective female connection element forming a mating pair of connection elements.

16. The self-aligning roller bearing according to claim 11, wherein the outer radial gap is between zero point five millimeters (0.5 mm) and five point zero millimeters (5.0 mm).

17. The self-aligning roller bearing according to claim 11, wherein the self-aligning roller bearing is provided with an inner radial gap between a radially inner surface of the ring-formed shield and the inner ring such that a friction-free rotation is provided at the inner radial gap between the ring-formed shield and the inner ring during use of the self-aligning roller bearing.

18. The self-aligning roller bearing according to claim 11, wherein the ring-formed shield is provided axially outside the cage side portion.

19. The self-aligning roller bearing according to claim 11, wherein the ring-formed shield is completely provided axially within the inner ring and the outer ring.

20. The self-aligning roller bearing according to claim 11, wherein the cage side portion is ring-formed and extends radially such that it contacts the inner ring or the outer ring.

* * * * *